United States Patent [19]
Hirota et al.

[11] Patent Number: 6,099,055
[45] Date of Patent: Aug. 8, 2000

[54] BUMPER REINFORCING STRUCTURAL UNIT

[75] Inventors: Tomoo Hirota; Toru Yabe; Yoshiaki Togawa, all of Ichihara, Japan

[73] Assignee: Sumitomo Chemical Company, Limited, Osaka, Japan

[21] Appl. No.: 09/368,181

[22] Filed: Aug. 4, 1999

[30] Foreign Application Priority Data

Aug. 7, 1998 [JP] Japan .................................. 10-236554

[51] Int. Cl.⁷ .................................................. B60R 19/18
[52] U.S. Cl. ............................................................ 293/120
[58] Field of Search .................... 293/120, 102, 293/110, 136

[56] References Cited

U.S. PATENT DOCUMENTS

| | | |
|---|---|---|
| 3,869,167 | 3/1975 | Muller . |
| 3,876,243 | 4/1975 | Bell et al. . |
| 4,022,505 | 5/1977 | Saczawa, Jr. . |
| 4,105,236 | 8/1978 | Haar . |
| 4,457,547 | 7/1984 | Sekiyama et al. .................. 293/110 |
| 4,492,398 | 1/1985 | Peter ................................. 293/120 |
| 4,925,224 | 5/1990 | Smiszek ............................. 293/120 |
| 4,941,701 | 7/1990 | Loren ................................. 293/155 |
| 5,219,197 | 6/1993 | Rich et al. ......................... 296/120 |
| 5,727,826 | 3/1998 | Frank et al. ....................... 293/102 |

FOREIGN PATENT DOCUMENTS

| | | |
|---|---|---|
| 2237136 | 2/1973 | Germany . |
| 2711277 | 11/1977 | Germany . |
| 58-89438 | 11/1981 | Japan . |
| 3-227750 | 10/1991 | Japan . |
| 6-298018 | 10/1994 | Japan . |
| 9-226484 | 9/1997 | Japan . |

*Primary Examiner*—Dennis H. Pedder
*Assistant Examiner*—Mickki D. Murray
*Attorney, Agent, or Firm*—Sughrue, Mion, Zinn, Macpeak & Seas, PLLC

[57] ABSTRACT

A bumper reinforcing structural unit that can be manufactured at low cost, and provides superior impact resistance in a light weight body. The bumper reinforcing structural unit made of a polymeric resin includes a frame body portion having an upper plate, a lower plate and two end plates for forming an interior space therein. Transverse partition plates divide the interior space of the frame body portion along a longitudinal direction into a central space and two end spaces. A front plate covers the front of the central space, and two back plates cover the back of the end spaces.

11 Claims, 5 Drawing Sheets

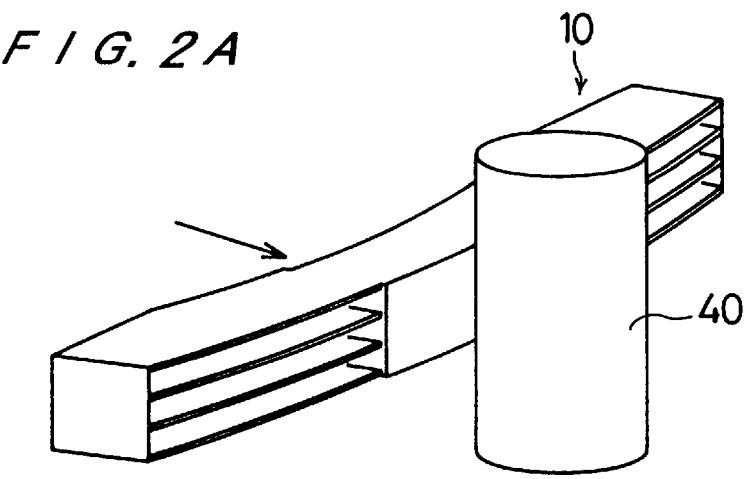
FIG. 2A
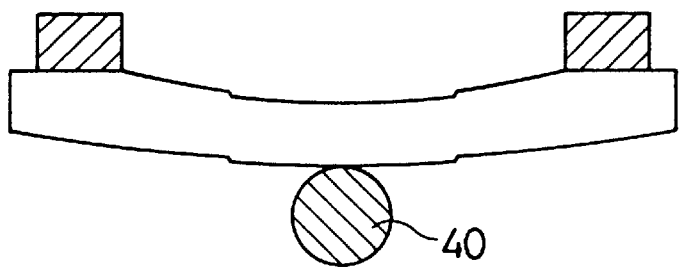
FIG. 2B
FIG. 4
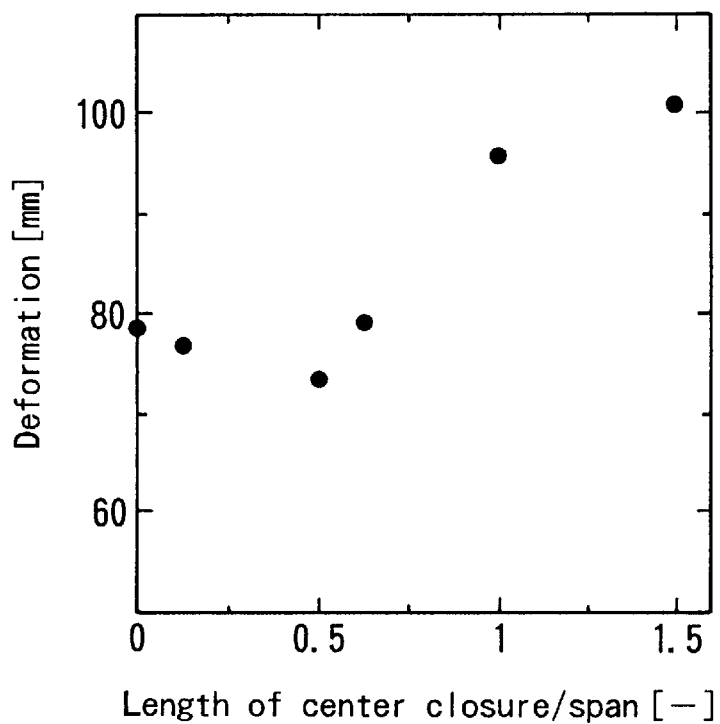

F I G. 5
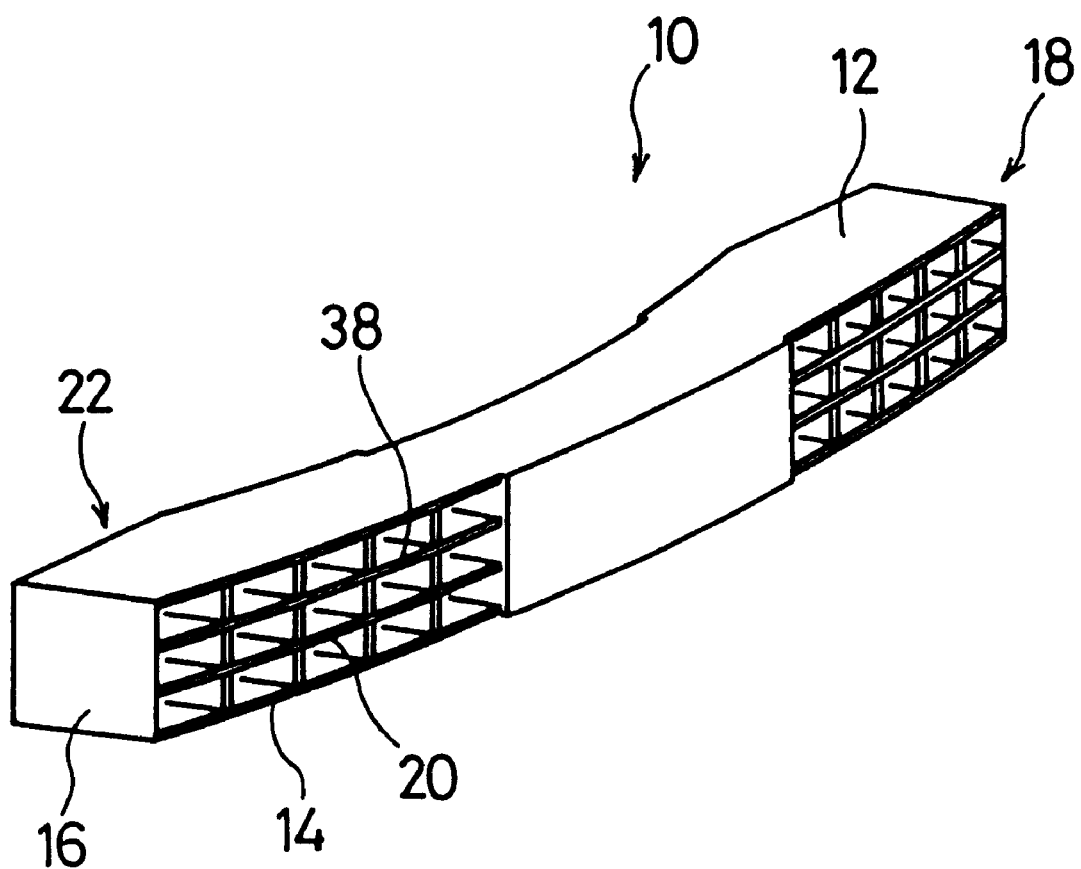

BUMPER REINFORCING STRUCTURAL UNIT

BACKGROUND OF THE INVENTION

1. Field of the Invention

The present invention relates to a bumper reinforcing structural unit placed behind the bumper facia to absorb impact loads.

2. Description of the Related Art

FIG. 6 shows a cross sectional view of an impact absorbing arrangement for a passenger vehicle, disposed at the front and rear of the vehicle, including a bumper facia 102 arranged beneath the body panel 100, and a reinforcing member 104 placed behind the rear surface of the bumper facia 102 to protect the body panel 100 from potential damage. The reinforcing member 104 is attached to a transverse member 108 via a bracket 106. In recent years, traditional metal structure has been replaced with structural polymers to reduce the weight and improve the corrosion resistance of the reinforcing member 104.

In a Japanese Laid-open Patent Publication (JLPP), H3-227750, a molded resin reinforcing structure is disclosed, which is comprised by an upper plate, a lower plate and a vertical wall to close the back while leaving the front open, and the internal space is divided by partition plates.

Another JLPP H6-298018 discloses a bonded reinforcing structure comprised by a channel shaped member bonded to a separate reinforcing-plate to reinforce the back side of the channel shaped member. Depression sections are provided in lateral positions of the reinforcing unit having a hole for attaching the structure to the chassis. Also, a JLPP H9-226484 discloses a reinforcing structure in which the open section is totally closed with a separate plate member.

These structures share a common feature that the center front section is shaped as a protruding arch, and the reinforcing member is attached at its transverse ends to the chassis. The aim is to absorb the impact energy applied to the bumper first by elastic deformation followed by further plastic deformation of the reinforcing member, if necessary.

Such conventional designs present some advantages as well as disadvantages. Those types, typified by JLPP H3-227750, having a closed back and an open front, have a problem of weak resistance to frontal impact load, and, to compensate for the frontal weakness, the overall structure is strengthened by increasing the component weight so as to be able to absorb a given amount of impact energy. Those with a complete open back, typified by JLPP H6-298018, tend to open outwards when a frontal load is applied. To compensate for this weakness, a reinforcing-plate is attached to the open back, but because it is a separate member, it offers limited impact absorption and presents a problem of increasing the number of assembling steps required. For the design disclosed in JLPP H9-226484, although the strength is adequate because the back surface is completely closed by a reinforcing-plate, assembling steps as well as its overall weight are increased.

SUMMARY OF THE INVENTION

It is an object of the present invention to provide a bumper reinforcing structural unit that can be manufactured at low cost, and provides superior impact resistance in a light weight body.

The object has been achieved in a bumper reinforcing structural unit made of a polymeric resin for absorbing an impact force applied to a bumper facia, comprising: a frame body portion having an upper plate, a lower plate and two endplates for forming an interior space therein; transverse partition plates dividing the interior space of the frame body portion along a longitudinal direction into a central space and two end spaces; a front plate covering the front of the central space; and two back plates covering the back of the end spaces.

The design of the bumper produces a frame structure enclosed by the front plate and the back plates placed alternatingly in the longitudinal direction. Therefore, compared with encasing the entire frame with the front and back plates, the structure is relatively light weight but has superior strength to withstand frontal impact, particularly in the central section. Because the bumper unit can be produced by injection molding, injection compression molding or compression molding, and the frame body portion, the transverse partition plates, the front plate and the back plates can be integrally formed, manufacturing steps are thus minimized to save cost. Also, the frontal region of the unit impacted by the bumper facia is protected by the front plate so that excessive deformation of the bumper facia can be prevented. The frame body portion can be provided with a suitable arrangement of longitudinal or transverse ribs in appropriate locations.

The frame body portion may include a forward curving arch section. This design further improves the ability to resist frontal impact loading on the central section of the unit. The frame body portion may include attachment sections provided at transverse ends thereof for attachment to a chassis of a vehicle.

The central space may have a longitudinal length C and the attachment sections may have a longitudinal distance B such that a ratio C/B is in a range of $0<C/B \leq 0.6$. It is preferable that the ratio be 0.25~0.55. Impact resistance per unit weight of the bumper reinforcing body is maximized in such a range.

The resins for making the bumper reinforcing structural unit can be either thermoplastic resins or thermosetting resins with or without inorganic filler materials.

The bumper reinforcing structural unit may be made of a material comprising an olefin based resin or an olefin based resin composition. Because the olefin based resins have lower specific gravity compared with other resins, the unit can be made light weight. Same considerations apply for olefin based resin compositions.

In the present specification, the word "Olefin based resin" means homopolymers of α-olefins having 2~20 carbons, or copolymers including more than 50 wt % repeating units of the α-olefins derivatives.

Olefin based resins are not particularly limited and may include homopolymers of α-olefin, such as ethylene, propylene, butene-1, pentene-1, hexene-1, 3-methylbutene-1, 4-methylpentene-1, or copolymers made of the foregoing α-olefin(s) with other unsaturated monomers. Or, other copolymers are possible, which are comprised by at least two kinds of monomers selected from α-olefin, having more than three carbons, and ethylene. These substances may be used singly or in combination.

Of the substances mentioned above, high-density polyethylene, medium-density polyethylene, low-density polyethylene, linear polyethylene, ethylene-vinyl acetate copolymer, ethylene based resins such as ethylene-ethylacrylate copolymer, and propylene based resins, such as isotactic polypropylene, syndiotactic polypropylene and propylene-ethylene block copolymer, are preferable. Propylene resins are most preferable.

Also, other olefin based resin compositions which can be used are those containing at least one thermoplastic elastomer and/or at least one inorganic filler.

Thermoplastic elastomer may include olefin based elastomers or styrene based elastomers. Olefin based elastomers may include amorphous random olefin based copolymer elastomers chiefly containing olefin, such as ethylene-propylene copolymer rubber, ethylene-propylene non-conjugated diene based copolymer rubber, ethylene-butene-1 copolymer rubber, ethylene-butene-1 non-conjugated diene based copolymer rubber, propylene-butadiene based copolymer rubber or ethylene-octene based copolymer rubber. Non-conjugated dienes include dicyclopentadiene, 1,4-hexadiene, cyclooctadiene, methyl norbornene, ethylidene norbornene.

Styrene based elastomers include styrene-butadiene block copolymer, styrene-isoprene block copolymer, hydrogenated styrene-isoprene block copolymer, styrene grafted ethylene-propylene copolymer rubber, styrene grafted ethylene-propylene non-conjugated diene copolymer rubber, styrene-ethylene-butylene-styrene block copolymer rubber.

Inorganic fillers that can be incorporated into the resins include talc, mica, wollastonite, calcium carbonate, barium sulphate, magnesium carbonate, clay, alumina, silica, calcium sulphide, carbon fibers, glass fibers, metal fibers, titanium oxide, carbon black, magnesium hydroxide, and diatomaceous earth.

Additives to the resin or resin compositions include antioxidant agents, ultraviolet absorbing agents, lubricants, pigments, antistatic agents, copper corrosion inhibitors, neutralizers and nucleating agents.

The bumper reinforcing structural unit may be made of a material comprising a resin or a resin based composition which is the same as that used for the bumper facia. This approach enables recycled facia material to be utilized totally or in part in the feed mix, which is useful to maintain the environment. The material for bumper facia can be either a thermoplastic or thermosetting resin. Inorganic fillers may be added.

The frame body portion may be provided with a longitudinal or transverse rib in a suitable location thereby to reinforcing the frame body portion.

As explained above, the present bumper reinforcing structural unit is light weight and yet it offers superior resistance to central impact loading. The unit is designed to be manufactured by injection molding or other automated molding techniques so that processing steps are minimized and the production cost is low.

BRIEF DESCRIPTION OF THE DRAWINGS

FIGS. 2A, 2B are illustrations of a pole impact testing;

FIG. 4 is a graph of deformation and ratio of the center closure length to span length;

FIG. 5 is a perspective view of an impact absorbing structural unit of the present invention.

DETAILED DESCRIPTION OF THE PREFERRED EMBODIMENTS

Figure 1A:
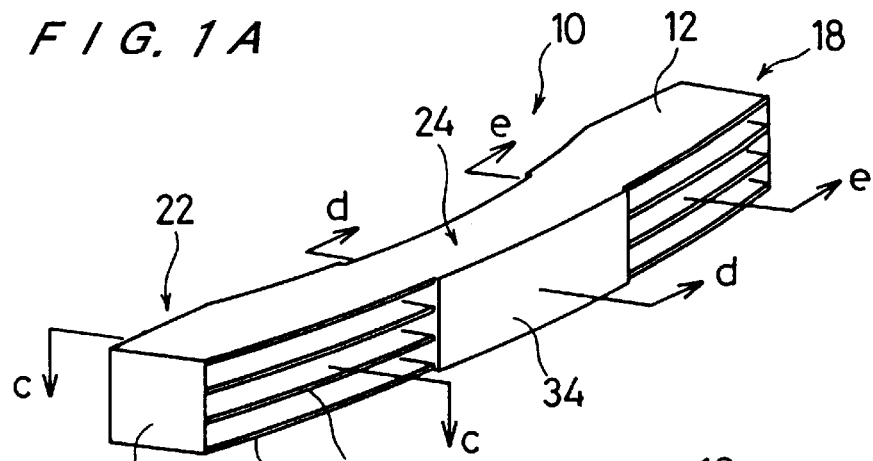
FIGS. 1A–1E are various views of an embodiment of the reinforcing structural unit of the present invention.
Figure 1B:
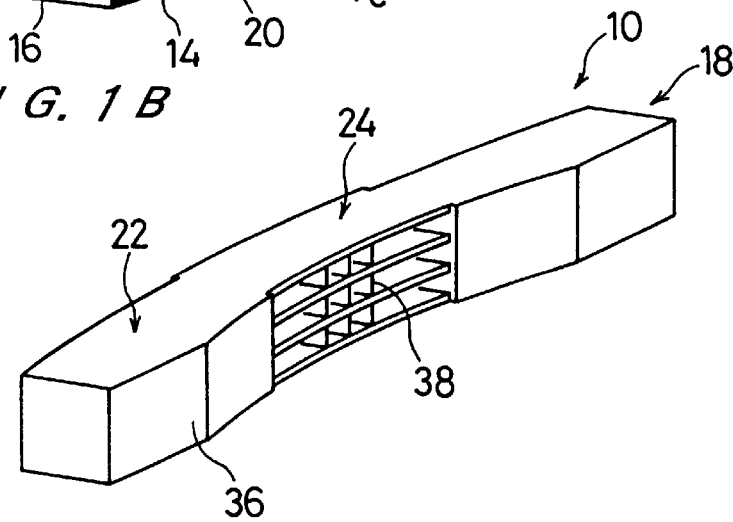
Figure 1C:
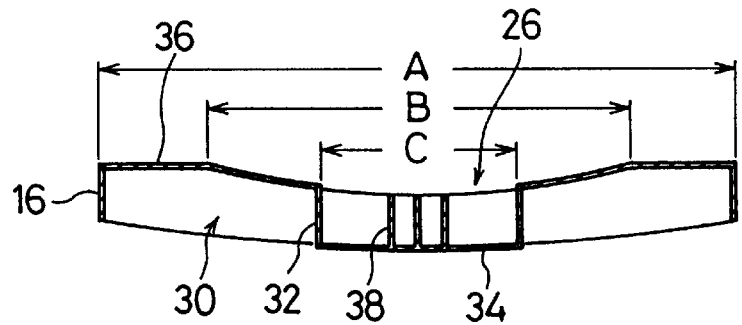
Figure 1D:
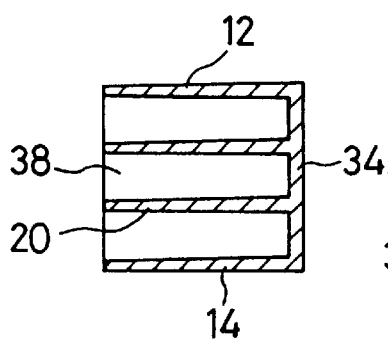
Figure 1E:
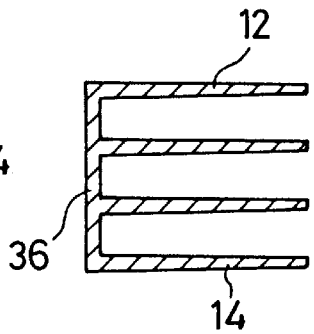

Preferred embodiments will be presented with reference to the drawings. FIGS. 1A–1E are various views of an embodiment of the reinforcing unit 10, where FIG. 1A is a front perspective view, FIG. 1B is a back perspective view, FIG. 1C is a cross sectional view through a plane c—c in FIG. 1A, FIG. 1D is a cross sectional view through a plane d—d in FIG. 1A, and FIG. 1E is a cross sectional view through a plane e—e in FIG. 1A.

The reinforcing unit 10 is made of an impact-resistant polypropylene resin (propylene-ethylene block copolymer). A frame body 18 is integrally comprised by an upper plate 12 and a lower plate 14 respectively extending horizontally in the longitudinal direction, and left and right transverse end plates 16. There are two horizontal ribs 20 in parallel between the upper and lower plates 12, 14. There are two chassis attachment sections 22, each having a flat back surface of a given area, at each end of the frame body 18. The mid-section of the frame body 18 between the two attachment sections 22 constitutes a mildly forward curving arch section 24.

As shown in FIG. 1C, the frame body 18 includes two vertical partition plates 32 for dividing the inside space into three spaces along the longitudinal direction, a central space 26 and two end spaces 30. A front plate 34 covers the front opening of the central space 26, and two back plates 36 cover the two back openings of the two end spaces 30 to provide a unit of continuous structure by integrating with the upper and lower plates 12, 14 and the partition plates 32. Also, in this embodiment, three vertical ribs 38 are in parallel with the partition plates 32 and are integral with the back surface of the front plate 34. The closure length C of the front plate 34, which is the same as the opening dimension of the central space 26, is determined as its ratio to the span length B of the arch section 24, in other words, the ratio of C/B should be larger than 0 and not more than 0.6, and more preferably between 0.25~0.55.

The reinforcing unit 10 of such a design can be produced as an integral unit by the normal injection molding process. Specifically, because the central section is open to the back and the end sections are open to the front, the cores associated with the three spaces separated by the partition plates 32 inside the frame body 18 can be pulled out from the open sides. Also, as shown in FIGS. 1C–1E, the horizontal ribs 20 and the vertical ribs 38 are tapered towards the tip end so as to enable the molds to be withdrawn from the molded product.

In the following, impact simulation test results obtained by using finite element methods (FEM) will be presented. As illustrated in FIGS. 2A, 2B, testing is based on the pole impact testing method to determine the deformation resulting from impacting the front central section of a test sample with a pillar (pole) 40 with a given amount of impact energy. Dynamic simulation tests were performed so that the pole, having a diameter of 178 mm and a weight 1,000 kg, collided at an impact speed at 8 km/hr with the test sample. Design parameters of the sample structural units were evaluated by varying the length dimension C of the front plate 34 in a range of 0~1200 mm, while the total weight at 5.07 kg and other dimensions of the reinforcing unit were kept constant, i.e., length A at 1200 mm; length of the arch section B at 800 mm.

The application software used for analyses was LS-DYNA3D (version 9.30) developed by Livermore Software Technology Corporation. Sample material was impact resistant polypropylene resin (polypropylene-ethylene block copolymer), and the material properties were determined using the Cowper-Symonds model shown below.

$$\sigma_y, \sigma_{yo}[1+(\epsilon/C)^{1/p}]$$

where $\sigma_y$ is the yield stress, $\sigma_{y0}$ is the static yield stress, $\epsilon$ is a strain rate, C and P are parameters.

Tables 1 shows the variables and the physical data.

TABLE 1

| Cowper-Symonds Parameters | | Static yield stress | Elastic Coefficient | Specific gravity |
|---|---|---|---|---|
| C [l/s] | P [-] | $\sigma_{y0}$ [MPa] | E [MPa] | [-] |
| 81.5 | 3.70 | 21.0 | 991 | 0.90 |

Figure 3:
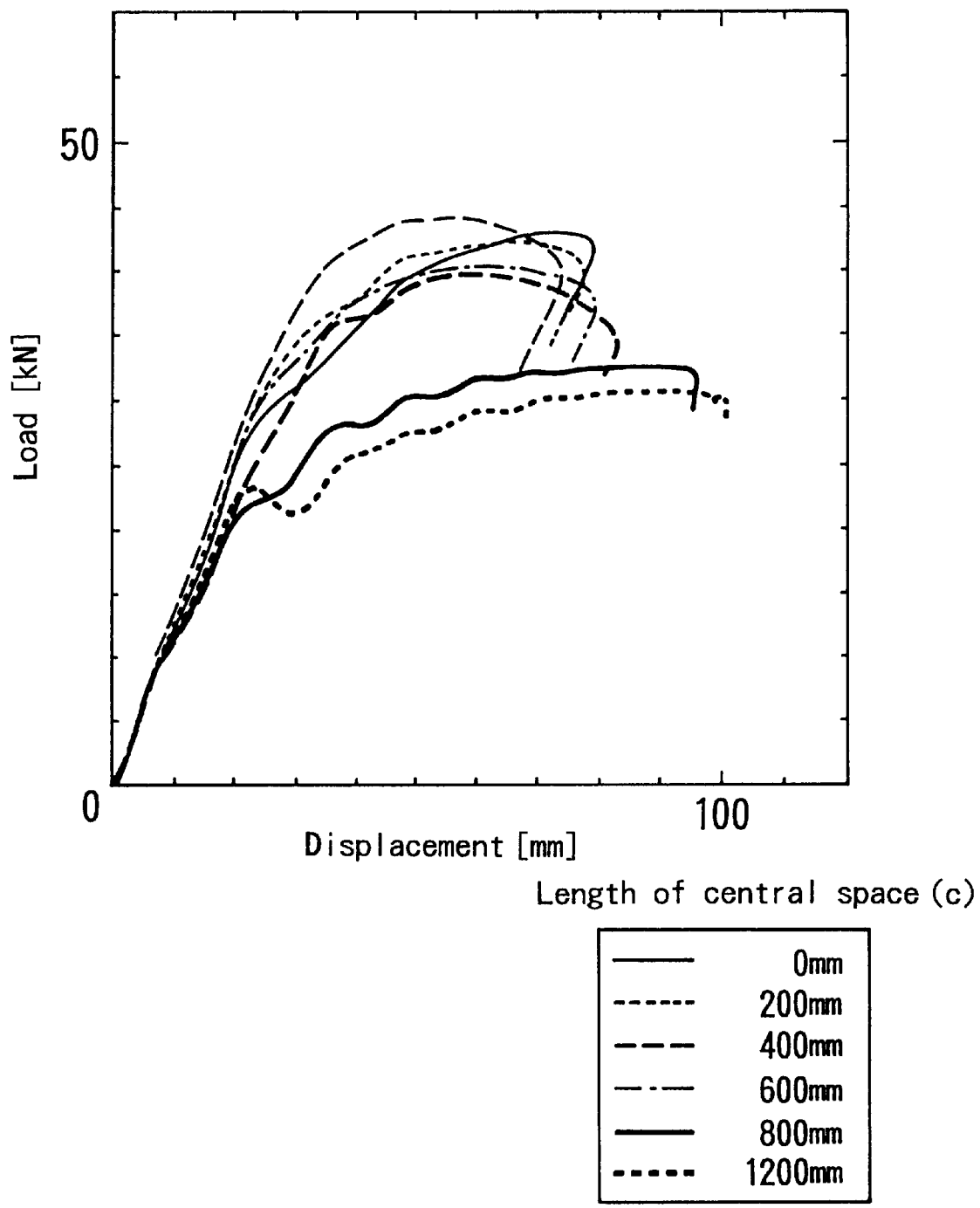
FIG. 3 is a graph of load and displacement results of pole impact testing.
Figure 6:
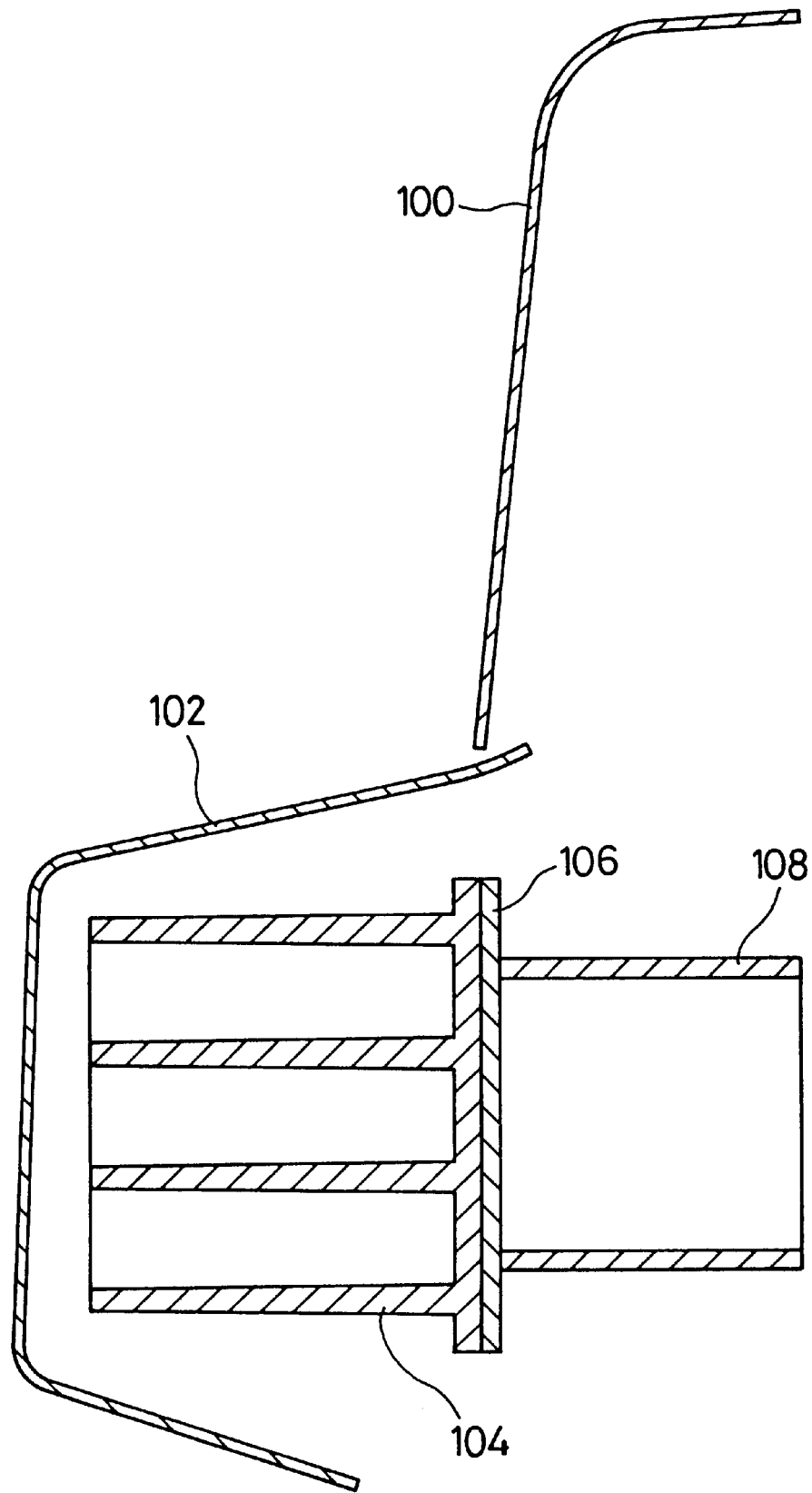
FIG. 6 is a perspective view of another impact absorbing structural unit of the present invention.

Analytical results are shown in FIG. 3 and in Table 2.

TABLE 2

| Total length A [mm] | Span (B) [mm] | Length of center closure (C) [mm] | C/B [-] | Deformation [mm] |
|---|---|---|---|---|
| 1200 | 800 | 0 | 0 | 78.7 |
| | | 200 | 0.25 | 76.9 |
| | | 400 | 0.5 | 73.6 |
| | | 600 | 0.625 | 79.2 |
| | | 800 | 1.0 | 95.9 |
| | | 1200 | 1.5 | 101 |

FIG. 4 summarizes the simulation results in terms of the deformation of the reinforcing unit 10 and the length of center closure by the front plate 34. The results show that the deformation is less than 80 mm when 0<a≦0.6, where a=C/B, ratio of the center closure length C to span length B, but when the ratio "a" exceeds this range, the deformation increases significantly.

In the above embodiment, two horizontal ribs 20 and three vertical ribs 38 are provided in the central space 26, but it is permissible to provide vertical ribs 38 in the end spaces 30 as shown in FIG. 5.

What is claimed is:

1. A bumper reinforcing structural unit made of a polymeric resin for absorbing an impact force applied to a bumper facia, comprising:
    a frame body portion having an upper plate, a lower plate and two transverse end plates forming an interior space therein;
    transverse vertical partition plates dividing said interior space of said frame body portion along a longitudinal direction into a central space and two end spaces, wherein each of said central space and said two end spaces has a front and a back;
    a front plate covering said front of said central space; and
    two back plates covering said back of said end spaces wherein said front of at least one of said end spaces is open from one of said transverse vertical partition plates to one of said transverse end plates.

2. A bumper reinforcing structural unit made of a polymeric resin for absorbing an impact force applied to a bumper facia, comprising:
    a frame body portion having an upper plate, a lower plate and two transverse end plates forming an interior space therein;
    transverse vertical partition plates dividing said interior space of said frame body portion along a longitudinal direction into a central space and two end spaces, wherein each of said central space and said two end spaces has a front and a back;
    a front plate covering said front of said central space; and
    two back plates covering said back of said end spaces,
    wherein said frame body portion, said transverse vertical partition plates, said front plate and said back plates are monolithically formed as one piece.

3. A bumper reinforcing structural unit according to claim 1, wherein said frame body portion includes a forward curving arch section.

4. A bumper reinforcing structural unit according to claim 1, wherein said frame body portion includes attachment sections provided at transverse ends thereof for attachment to a chassis.

5. A bumper reinforcing structural unit according to claim 4, wherein said central space has a longitudinal length C and said attachment sections are separated by a longitudinal distance B such that a ratio of said central-space-longitudinal length C to said longitudinal-separation distance B is greater than 0 and is less than or equal to 0.6.

6. A bumper reinforcing structural unit according to claim 1, wherein said bumper reinforcing structural unit is made of a material comprising an olefin based resin or an olefin based resin composition.

7. A bumper reinforcing structural unit according to claim 1, wherein said bumper reinforcing structural unit is made of a material comprising a resin or a resin based composition which is the same as that from which said bumper facia is made.

8. A bumper reinforcing structural unit according to claim 1, wherein said frame body portion is provided with a longitudinal or transverse rib.

9. A bumper reinforcing structural unit according to claim 1, wherein said front of each of said end spaces is open.

10. A bumper reinforcing structural unit according to claim 9, wherein said back of said central space is open.

11. A bumper reinforcing structural unit according to claim 1, wherein said back of said central space is not completely covered.

* * * * *